United States Patent [19]

Alcock et al.

[11] 4,136,342
[45] Jan. 23, 1979

[54] RESOLVING ANGULAR AMBIGUITY

[75] Inventors: Robert N. Alcock, Reigate; David A. Lucas, Crawley Down; Richard P. Vincent, Crawley, all of England

[73] Assignee: U.S. Philips Corporation, New York, N.Y.

[21] Appl. No.: 776,262

[22] Filed: Mar. 10, 1977

[30] Foreign Application Priority Data

Mar. 15, 1976 [GB] United Kingdom ............... 10256/76

[51] Int. Cl.² ............................................. G01S 5/02
[52] U.S. Cl. ............................................. 343/113 R
[58] Field of Search ................................... 343/113 R

[56] References Cited

U.S. PATENT DOCUMENTS

3,889,267  6/1975  Lucas et al. ..................... 343/113 R

Primary Examiner—Theodore M. Blum
Attorney, Agent, or Firm—Algy Tamoshunas

[57] ABSTRACT

Angular ambiguity, particularly in measurements made in radio interferometers, is resolved by comparing an ambiguous value for a desired angle with an unambiguous value for an angle which is ideally equal to the desired angle but which may differ from it by an error angle less than $\pi$. For example, ambiguity in the phase difference between a pair of widely-spaced antennas may be resolved by reference to the sum of two unambiguous phase differences between each of those antennas and an intermediate antenna. The effect on the ambiguity-resolution process of certain sources of phase errors in practical systems can be eliminated, leaving a large tolerance to remaining errors.

16 Claims, 7 Drawing Figures

RESOLVING ANGULAR AMBIGUITY

This invention relates to a method of resolving angular ambiguity, that is to say, of deriving from a quantity representative of a first angle which lies in a range of $2\pi$ radians a further quantity representative of an associated angle which it is known may differ from the first angle by an integral multiple of $2\pi$ radians; the integral multiple may be zero, in which case the two angles are of course equal, and the two quantities may then also be equal. The invention relates particularly but not exclusively to such a method wherein the first quantity is representative of a phase-difference measurement between two electrical or electromagnetic signals and wherein the further quantity is representative of the "actual" phase-difference, so far as can be determined with the aid of one or more further phase-difference measurements, between said two signals.

The invention further relates to apparatus for deriving a quantity representative of the "actual" phase-difference between electrical or electromagnetic signals by the method.

The invention further relates to radio interferometer systems each comprising a series of antenna elements and further comprising such apparatus for deriving from radiation incident on the elements a quantity representative of an "actual" phase-difference between elements of the series.

It is an object of the invention to provide an improved method of resolving angular ambiguity whereby it may be possible correctly to resolve ambiguity with a relatively large tolerance to error in one or more said quantities.

According to a first aspect of the invention, the invention provides a method of deriving from a first quantity representative of an angle $2\pi F$ radians, where F is as herein defined, and from a second quantity representative of an angle $\Phi_2$ radians a third quantity representative of an angle $\Phi_1 = 2\pi (I + F)$ radians, where I is an integer which may be zero and wherein the second and third quantities are notionally or ideally equal but may differ by an amount representative of an error angle of magnitude less than $\pi$ radians.

In this specification, F, with or without subscripts, is used to denote a number lying in a range between a minimum value $F_{MIN}$ and a maximum value $F_{MAX}$, that is to say, either $F_{MIN} \leq F < F_{MAX}$  (i)

or $F_{MIN} < F \leq F_{MAX}$,  (ii)

where $F_{MAX} - F_{MIN} = 1$.  (iii)

An "error angle" is to be understood to mean that a difference between the second and third quantities is due to the presence of one or more errors, but should not be taken to imply that either the second or third quantity is necessarily free of error.

In circumstances such that a reasonable assumption can be made of the conditions likely to result in an error angle of magnitude equal to (rather than less than) $\pi$ radians, for example conditions likely to result in an error angle of $+\pi$ radians, it may be possible to derive from the first and second quantities a value for the third quantity such that the ambiguity resolution is unlikely to be erroneous.

In one method embodying the invention, the second quantity is derived by the addition of further quantities. The term "addition" is here to be understood to include subtraction, in that subtraction from one quantity of another quantity is equivalent to addition to the former quantity of a quantity equal in magnitudee but opposite in sign to the latter quantity.

In another method embodying the invention, the second quantity is derived by the multiplication of a further quantity. The term "multiplication" is here to be understood to include division, in that division of one quantity by another quantity is equivalent to multiplication of the former quantity by the reciprocal of the latter quantity.

The preceding two paragraphs should not be taken to imply that addition or multiplication respectively is necessarily the only process involved in deriving the second quantity.

In one method embodying the invention, either $F_{MIN} = 0$ and $F_{MAX} = 1$  (iv)

or $F_{MIN} = -1$ and $F_{MAX} = 0$;  (v)

in another method, $F_{MIN} = -\frac{1}{2}$ and $F_{MAX} = +\frac{1}{2}$.  (vi)

Said quantities may be in digital, suitably binary digital, form; a method embodying the invention may then be readily performed using digital electronic circuitry. The angle $2\pi F$ radians may include a varying angle W radians, where W is as herein defined, to enable sensitivity or accuracy to be improved.

In this specification, W is used to denote a function which, over a minimum pre-determined period of time, has an average value of substantially zero, and which varies with time within a range of values in such a manner that substantially all values of W within that range are equally likely to occur within said period. A suitable function is a regular "triangular wave", that is to say, a periodic function in which a period consists of two linear portions having gradients of opposite sign, the peak values of the function being of equal magnitude and opposite sign. Another suitable function is random noise.

Both the first and second quantities may include a quantity representative of a predetermined angle; this may be used to increase tolerance to errors of a particular sense (i.e. positive or negative) in determining an unknown angle.

In a method embodying the invention, each of the quantities may be representative of, or derived from a quantity representative of, a phase-difference between electrical or electromagnetic signals. Such a method may be employed in radio interferometry using a series of two or more spaced antenna elements, wherein said signals are derived from radiation incident on elements of the series. A signal may be derived from radiation incident on a single element, or from radiation incident on a plurality of elements in, for example, radio interferometry using phased arrays of antenna elements; two or more signals may be derived from the same element.

The elements are suitably collinear; they may be regularly spaced.

According to a second aspect of the invention, apparatus for deriving a quantity representative of a phase-difference between electrical or electromagnetic signals comprises means for deriving a first quantity representative of a phase-difference measurement $2\pi$ F radians, where F is as herein defined, between the two signals of a first pair of said signals and a second quantity representative of a phase-difference measurement $\Phi_2$ radians between the two signals of a further pair of said signals or of a phase difference $\Phi_2$ radians derived from one or more phase-difference measurements between the two signals of each of one or more further pairs of said signals, and logic means for deriving a third quantity representative of a phase difference $\Phi_1 = 2\pi(I + F)$ radians, where I is an integer which may be zero, between the two signals of said first pair, whereby in operation the third quantity is derived from the first and second quantities by a method embodying the invention.

In this specification, means for deriving a quantity representative of a phase-difference measurement or of a phase difference derived from one or more phase-difference measurements is to be understood to comprise means for making said measurement or measurements.

As indicated above, it may be possible to arrange to resolve ambiguity with little likelihood of error in the case of an error angle of magnitude equal to (rather than less than) $\pi$ radians, on the basis of a reasonable assumption about the conditions likely to cause such an error angle. When no such assumption can be made, it may nevertheless be convenient to arrange to resolve ambiguity in an arbitrarily predetermined sense for an error angle of $+\pi$ or $-\pi$ radians, particularly if such an error angle is in practice very unlikely to occur.

According to a third aspect of the invention, a radio interferometer system comprises a series of (N + 1) spaced antenna elements, where N $\geq$ 1, and further comprises apparatus embodying the second aspect of the invention.

According to a fourth aspect of the invention, a radio interferometer system comprises a rectilinear series of (N + 1) antenna elements regularly spaced at intervals of L, forming between a common element C of the series and the 1st, 2nd, ... (N − 1)th, N th elements a series of N interferometer pairs of spacing L, 2 L, ... (N − 1) L, N L, where N $\geq$ 2, means for deriving from radiation incident on the elements a first series of quantities respectively representative of phase-difference measurements $2\pi F_n$ radians, where F is as herein defined, between the two elements of each of the said N pairs, where n = 1, 2, ... (N − 1), N, and a second series of quantities respectively representative of phase-difference measurements $2\pi F_{n(n-1)}$ radians, where F is as herein defined, between the two elements of each pair of adjacent elements except the pair including the common element C, that is to say where n = 2, 3, ... (N − 1), N, and logic means for successively deriving each quantity of a third series of quantities respectively representative of the angles $\Phi_n = 2\pi (I_n + F_n)$ radians, where $I_n$ is an integer which may be zero and n = 2, 3, ... (N − 1), N, from the quantity of the first series representative of the phase-difference measurement $2\pi F_n$ radians and from the sum of the quantity of the second series representative of the phase-difference measurement $2\pi F_{n(n-1)}$ radians and the quantity representative of the angle $\Phi_{n-1}$, where the quantity representative of $\Phi_1$ is representative of, or is derived from a quantity representative of, the phase-difference measurement $2\pi F_1$ radians between the first element of the series and the common element, whereby in operation each quantity of the third series is derived by a method embodying the invention.

A phase difference or phase-difference measurement "between" antenna elements is to be interpreted in the broad sense of a phase difference or phase-difference measurement between signals derived from said elements following the incidence thereof of the radiation. The signals may be of a different frequency from that of the incident radiation, and a constant or a varying phase difference may, for example, be added to a phase difference dependent on an angle of incidence of the radiation.

A radio interferometer embodying the invention where N $\geq$ 2 may comprise averaging means for deriving from quantities respectively representative of the phase differences between the two elements of each of two or more pairs of elements an average quantity representative of an angle $\theta$ of incidence of the radiation on the series of elements, said phase differences being functions of $\theta$.

In a radio interferometer system which embodies the invention, which comprises a rectilinear series of antenna elements and which is suitable for determining the angle of elevation of said radiation, suitably the series of elements extends substantially vertically, and $F_{MIN} = 0$ and $F_{MAX} = 1$. In this specification, the expression "determining" an angle of incidence is to be understood to include sector determination, i.e. determining in which of two or more pre-determined sectors the angle of incidence lies; in a simple case, this may involve only determining on which side of a given boundary line the angle lies.

U.K. Patent Specification No. 1,337,099 (U.S. Pat. No. 3,889,267) describes a radio interferometer system comprising a vertically-extending rectilinear array of regularly-spaced antenna elements and means for making phase-difference measurements between the lowest, common, element and each of the other elements; for the nth element, this phase difference may be denoted $$\Phi_n = 2\pi (I_n + F_n) \qquad \text{(vii)}$$

where $I_n$ is an integer and $F_n$ in this case lies between 0 and 1. Now phase discriminators are of course normally restricted to measuring phases within a range of $2\pi$ radians. On page 3 of the above-mentioned U.K. specification, it is shown, with reference to FIG. 3, how, provided the phase difference at the closest spaced pair, i.e. for n = 1 (or at each pair of adjacent elements, since the elements are regularly spaced) lies between 0 and $2\pi$, so that $I_1 = 0$ and the measurement $2\pi F_1$ is unambiguous, then it is possible to determine $\Phi_{n+1}$ from $I_n$, $F_n$ and $F_{n+1}$, provided that it may be assumed that $|\Phi_{n+1} - \Phi_n|$ is less than $\pi$.

The basis of the present invention is the concept of modifying this principle in order to apply it to a different situation: instead of using an ambiguous measured value, $2\pi F_1$, of an angle $\Phi_1$ and an unambiguous value, $2\pi (I_2 + F_2)$, of an angle $\Phi_2$ expected to differ from $\Phi_1$ (by an amount less than $\pi$ radians) in order to derive an unambiguous value, $2\pi (I_1 + F_1)$, for $\Phi_1$, one can use the ambiguous measured value, $2\pi F_1$, of an angle $\Phi_1$ and an unambiguous estimate, $2\pi (I_2 + F_2)$, of an angle $\Phi_2$ notionally equal to $\Phi_1$ in order to derive effectively a second unambiguous estimate, $2\pi (I_1 + F_1)$, of which is notionally one and the same angle. Since in practice the measured value $2\pi F_1$ can usually be expected to be more accurate than $2\pi F_2$, the second estimate, $2\pi (I_1 +$ $F_1$), will correspondingly usually be more accurate than the first, $\Phi_2 = 2\pi (I_2 + F_2)$. A particular advantage of the invention is that it becomes possible correctly to resolve the ambiguity in $2\pi F_1$ with a large tolerance to errors. A further advantage is that a radio interferometer system embodying the invention may have a larger angular coverage than a comparable known system.

It will of course be appreciated that in apparatus comprising means for performing a method embodying the invention, angles will be represented by respective quantities which may, for example, be in digital form: therefore references in the preceding paragraph and hereinafter to angles should be interpreted, where appropriate, as quantities representative of such angles.

Figure 3:
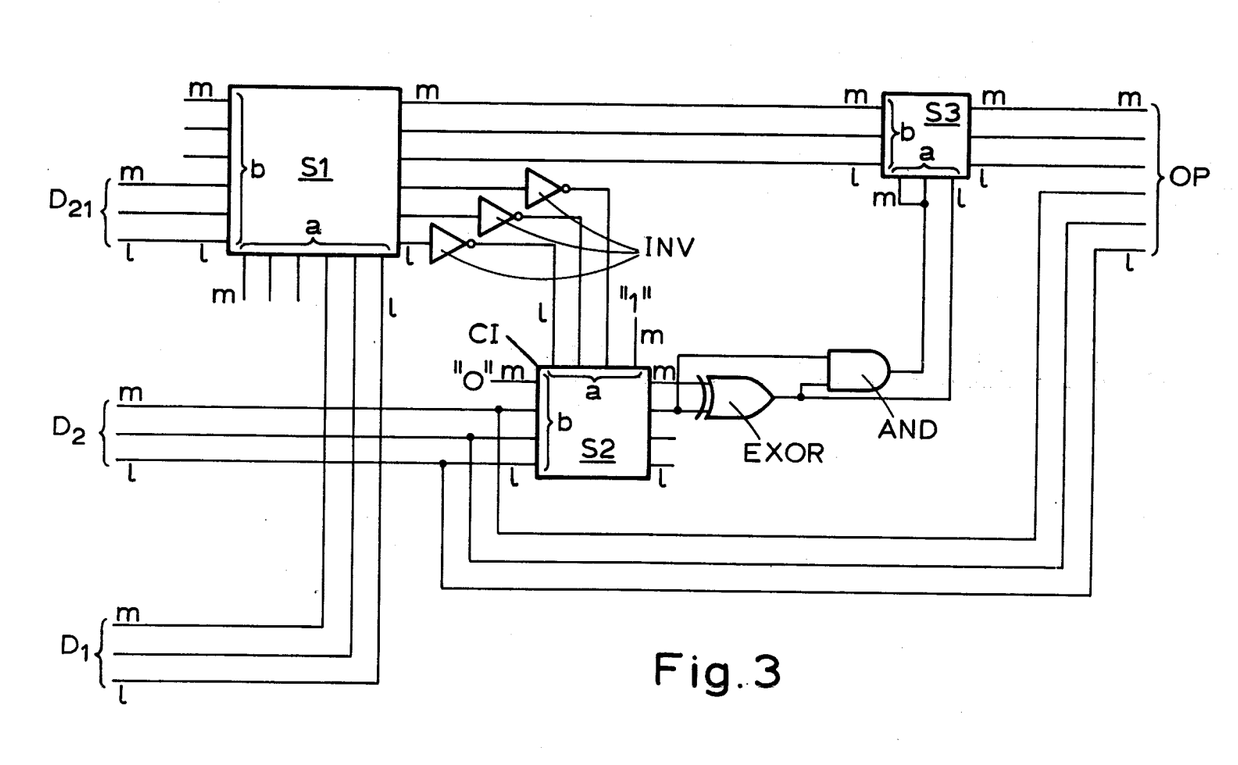
FIG. 3 is a block diagram of a logic circuit.

A particular application of the principle of this invention is to increase the tolerance to phase errors of the process of ambiguity resolution in the determination of phase differences between antenna elements of radio interferometer systems; but it will be appreciated from the general nature of the angle diagrams in FIG. 3 of the above-mentioned U.K. specification that the principle of the invention is applicable to any appropriate measurements of phase differences, or indeed to any appropriate angles whatever their significance. It will further be appreciated that the dotted line at the "12 o'clock position" in each of the above-mentioned angle diagrams, which therein denote the boundary between F = 0 and F = 1, may denote the boundary between any two arbitrary values of F differing by unity.

Embodiments of the invention will now be described, by way of example, with reference to the accompanying diagrammatic drawings, in which.

Each of the radio interferometer systems illustrated in the Figures comprises a series of antenna elements, one of which may be considered to be a common element with which the other elements form a number of different interferometer pairs; this common element is denoted C. Phase discriminators D arranged to measure a phase difference between the common element and another element are denoted by a single subscript to D which is the number of that element in the series, the element adjacent the common element being the first; phase discriminators arranged to measure a phase difference between two elements, neither of which is the common element, are denoted by two subscripts to D which are the respective numbers of the two elements.

Figure 1:
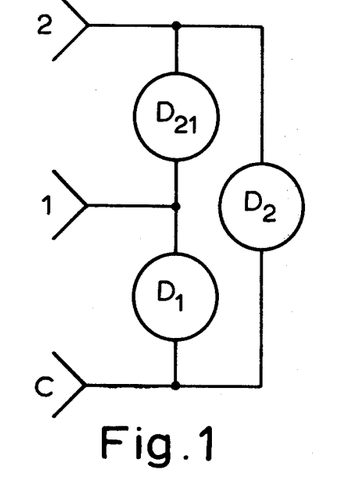
FIG. 1 illustrates schematically a first radio interferometer system.

FIG. 1 represents schematically a radio interferometer system comprising a series of three collinear antenna elements, C, 1 and 2 respectively, regularly spaced at intervals of L, and three phase discriminators $D_1$, $D_2$ and $D_{21}$ respectively arranged to measure a phase difference between the elements 1 and C, 2 and C, and 2 and 1 of signals respectively derived from radiation incident on the elements; these phase differences may be respectively denoted $\Phi_1$, $\Phi_2$ and $\Phi_{21}$ where $$\Phi = 2\pi (I + F) \tag{viii}$$

with appropriate corresponding subscripts on each side of the equation. The phase discriminators are adapted to measure phases in the range of 0 to $2\pi$ radians, i.e. $2\pi F$, where $F_{MIN} = 0$ and $F_{MAX} = 1$, and $F \geq F_{MIN}$.

In the absence of errors, $$\Phi_1 = \Phi_{21} = 2\pi L \sin \theta / \lambda \tag{ix}$$

where $\lambda$ is the wavelength of the radiation and $\theta$ is its angle of incidence measured relative to the normal to the line on which the three elements lie. In general, if conditions are such that $\Phi_1$ and $\Phi_{21}$ lie between 0 and $2\pi$, $$I_1 = I_{21} = 0, \tag{x}$$

and the phase discriminators $D_1$ and $D_{21}$, which measure $2\pi F_1$ and $2\pi F_{21}$ respectively, indicate the unambiguous values of $\Phi_1$ and $\Phi_{21}$. The value of $\Phi_2$ as measured by $D_2$, namely $2\pi F_2$, is however ambiguous. This ambiguity may be resolved by reference to the sum $$\Phi_1 + \Phi_{21} = 2\pi (F_1 + F_{21}) \tag{xi}$$

which is notionally equal to $\Phi_2$; this sum may be denoted by $\Phi_S$, where $$\Phi_S = 2\pi (I_S + F_S). \tag{xii}$$

Using arguments analogous to those set out on page 3 of the above-mentioned U.K. Specification No. 1,337,099, it can be shown that provided $$|\Phi_2 - \Phi_S| < \pi, \tag{xiii}$$

$$\Phi_2 = 2\pi (I_2 + F_2) \tag{xiv}$$

where $I_2 = I_S$ if $|F_2 - F_S| < \frac{1}{2}$; (xv)

$$I_2 = I_S + 1 \text{ if } (F_2 - F_S) < -\frac{1}{2}; \tag{xvi}$$

and $I_2 = I_S - 1$ if $(F_2 - F_S) > +\frac{1}{2}$. (xvii)

The equations on page 3 of the above-mentioned U.K. specification also deal with the case of a phase difference equal to (rather than less than) $\pi$, i.e. equivalent to $|F_2 - F_S| = \frac{1}{2}$, by considering the circumstances in which such a case is likely to arise. If, in applications of the present invention, an analogous assumption of the likely circumstances may reasonably be made, it similarly becomes possible to resolve ambiguity for the case of $|F_2 - F_S| = \frac{1}{2}$.

The above analysis has dealt with the specific case of a series of three collinear, regularly-spaced antenna elements; however, geometrical considerations show that the analysis holds true irrespective of whether the three elements are collinear or regularly spaced, provided of course that $\Phi_1$, $\Phi_{21}$ and their sum $\Phi_S$ can be determined unambiguously.

Figure 2:
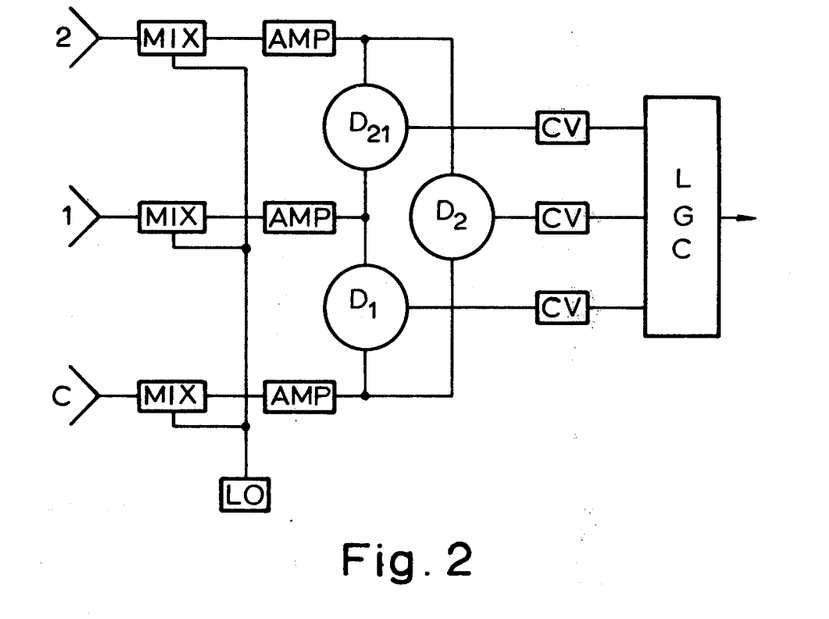
FIG. 2 is a block diagram of a circuit for the system of FIG. 1.

Sources of error in an arrangement such as that of FIG. 1 will now be examined with reference to FIG. 2, which is a block diagram showing in greater detail, by way of example, a circuit whereby the system depicted schematically in FIG. 1 may be realised. Radiation incident on each of the antenna elements passes to a respective mixer MIX to which a local-oscillator signal is also supplied from LO. The resulting intermediate-frequency output signals from the mixers are amplified by respective amplifiers AMP before being applied to the discriminators D; the arrangement is such that the relative phases of the radiation incident on the three elements are substantially maintained in the output signals from the amplifiers. The discriminators are each of a well-known kind in which an angular range of $2\pi$ radians for phase measurement is divided into a number of successive sub-ranges separated by regularly-spaced boundaries, and which produce a Johnson digital code representing an angle in the middle of the particular sub-range in which the measured phase difference lies. The Johnson codes are converted to pure binary codes by converters CV before being fed into a logic stage LGC which derives a digital representation of $\Phi_2$ by the method analysed above.

As mentioned above, in the absence of errors, $$\Phi_1 = 2\pi L \sin \theta/\lambda. \quad \text{(ix)}$$

Using, with appropriate subscripts, G to denote the propagation phase error (due for example to reflection) in the signal received by an antenna element, A to denote the phase error introduced by an amplifier, M to denote the phase error directly due to the discriminator measurement, that is to say, due to uncertainty in the effective positions of the boundaries between adjacent sub-ranges, and Q to denote the phase error due to the quantisation of phase measurements into finite sub-ranges (the maximum value of this error being, where as usual an angle representing a sub-range lies in the middle of it, half the angular difference between the boundaries of the sub-ranges), we can write $$\Phi_1 = 2\pi L \sin \theta/\lambda + G_1 + A_1 - G_C - A_C + M_1 + Q_1 \quad \text{(xviii)}$$

where $\Phi_1$ is in this case represented in binary form. Analogously, $$\Phi_{21} = 2\pi L \sin \theta/\lambda + G_2 + A_2 - G_1 - A_1 + M_{21} + Q_{21}. \quad \text{(xix)}$$

Hence $$\Phi_1 + \Phi_{21} = 4\pi L \sin \theta/\lambda + G_2 + A_2 - G_C - A_C + M_1 + M_{21} + Q_1 + Q_{21}. \quad \text{(xx)}$$

The sum $\Phi_1 + \Phi_{21}$ has been denoted above by $\Phi_S$. Now $$\Phi_2 = 4\pi L \sin \theta/\lambda + G_2 + A_2 - G_C - A_C + M_2 + Q_2, \quad \text{(xxi)}$$

and therefore $$\Phi_2 - (\Phi_1 + \Phi_{21}) = M_2 - M_1 - M_{21} + Q_2 - Q_1 - Q_{21} \quad \text{(xxii)}$$

It has been shown above that $\Phi_2$ can be determined unambiguously from $|(\Phi_1 + \Phi_{21})|$ and $F_2$ provided that $$|\Phi_2 - (\Phi_1 + \Phi_{21})| < \pi. \quad \text{(xiii)}$$

If the errors are independent and random, we may write, using $M_{MAX}$ to denote the maximum measurement error and $Q_{MAX}$ the maximum quantisation error, $$|\Phi_2 - (\Phi_1 + \Phi_{21})| > 3(|M_{MAX}| + |Q_{MAX}|), \quad \text{(xxiii)}$$

i.e. correct ambiguity resolution is possible provided $$3(|M_{MAX}| + |Q_{MAX}|) < \pi. \quad \text{(xxiv)}$$

Taking, for example, a value for $|M_{MAX}|$ of 3° and a value for $|Q_{MAX}|$ of $22\frac{1}{2}$° (i.e. quantisation in sub-ranges of 45° or $\pi/4$), we require $$3(3° + 22\frac{1}{2}°) < 180°,$$

i.e. $76\frac{1}{2}° < 180°$ for correct ambiguity resolution. (xxv)

It will be seen that with such values for the errors M and Q, there is a large phase margin to spare. It should also particularly be noted that with the arrangement of FIG. 2, the ambiguity resolution process is independent of propagation (and amplifier) errors, and is also independent of $\theta$ so that there is the same phase margin throughout the range of $\theta$ for which $\Phi_1$ and $\Phi_{21}$ are unambiguous.

FIG. 3 is a circuit block diagram of an arrangement suitable for carrying out the operations performed by the logic stage LGC of FIG. 2. The arrangement comprises three binary adders S1, S2 and S3 respectively, three inverters INV, an Exclusive-OR gate EXOR, and an AND gate AND. In the diagram, lines along which the most and least significant bits of a binary number are supplied are indicated respectively by m and l.

Angles measured by the discriminators D are assumed to be quantised in units of $\pi/4$, so that the outputs of the converters CV of FIG. 2 are three-bit binary numbers, representing fractional portions of $2\pi$ in units of $\pi/4$; integral multiples of $2\pi$ are represented by one or more further, more significant bits. The outputs from the converters CV are supplied along groups of lines at the extreme left of the Figure designated respectively by the discriminator from which the output is derived. The output derived from D$_1$, representing $2\pi F_1$, is fed to a first set of inputs $a$, and the output derived from D$_{21}$ is fed to a second set of inputs $b$ of a six-bit binary adder S1 which gives an output representing $\Phi_S = 2\pi (I_S + F_S)$. The three most-significant-bit inputs of both sets $a$ and $b$ of S1 are in this case supplied with digital representations of "0". The three least significant bits, representing $2\pi F_S$, are fed to the inverters INV which are connected to three inputs of a first set of inputs $a$ of a four-bit binary adder S2, to three inputs of a second set of inputs $b$ of which is fed the output derived from D$_2$, representing $2\pi F_2$. By supplying a digital representation of "1" to a further, "carry-in", input CI of S2, the adder effectively produces in the usual manner a representation of $2\pi (F_1 - F_S)$. A digital representation of "1" is also supplied to the most-significant-bit input of one of sets $a$ and $b$, for example $a$ as shown, while a digital representation of "0" is supplied to the most-significant-bit input of the other set; the purpose of this will become apparent hereinafter.

The most significant bit and next-most significant bit of the output of S2 are respectively fed to the two inputs of the Exclusive-OR gate EXOR; the output from this gate and the next-most significant bit of the output of S2 are respectively fed to the two inputs of the AND-gate AND. The output from the AND-gate is fed to the most-significant and next-most-significant-bit inputs of a first set of inputs $a$ of a three-bit binary adder S3; the output of the Exclusive-OR gate is fed to the least-significant-bit input of this set $a$. The three inputs of a second set of inputs $b$ of S3 are fed from the three most-significant-bit-outputs of S1 (representing $2\pi I_S$). The three-bit output of S3 forms together with the three-bit output derived from D$_2$ a six-bit number representing $\Phi_2 = 2\pi (I_2 + F_2)$ at the output OP on the lines at the extreme right of the Figure.

The operation of the circuit is as follows. As already explained, the three least significant bits of the output of S1 represent $2\pi F_S$ as a three-bit binary number, equivalent to an integer between 0 and 7 inclusive in decimal notation, which we may designate as $f_S$, where $f_S = 8 F_S$. The output of the inverters is a three-bit number, equivalent to $(7 - f_S)$, which is fed to inputs of set $a$ of S2. The inputs of set $b$ of S2 are fed with a three-bit number which represents $2\pi F_2$ in a form which we may analogously designate $f_2$. The output of S2 is a four-bit number equivalent to $$(7 - f_S) + 8 + f_2 + 1,$$

i.e. $16 + (f_2 - f_S),$ the quantity "8" being obtained from the representation supplied to the most-significant-bit input of set $a$ and the quantity "1" being obtained from the representation supplied to the "carry-in" input CI. The binary form of the output, the bits of which are designated $p, q, r$ and $s$, and the decimal equivalent of $(f_2 - f_S)$, are shown in Table 1.

TABLE I

| Binary output | | | | Decimal equivalent |
|---|---|---|---|---|
| p | q | r | s | $(f_2-f_s)$ |
| 1 | 0 | 0 | 1 | −7 |
| 1 | 0 | 1 | 0 | −6 |
| 1 | 0 | 1 | 1 | −5 |
| 1 | 1 | 0 | 0 | −4 |
| 1 | 1 | 0 | 1 | −3 |
| 1 | 1 | 1 | 0 | −2 |
| 1 | 1 | 1 | 1 | −1 |
| 0 | 0 | 0 | 0 | 0 |
| 0 | 0 | 0 | 1 | 1 |
| 0 | 0 | 1 | 0 | 2 |
| 0 | 0 | 1 | 1 | 3 |
| 0 | 1 | 0 | 0 | 4 |
| 0 | 1 | 0 | 1 | 5 |
| 0 | 1 | 1 | 0 | 6 |
| 0 | 1 | 1 | 1 | 7 |

The most- and next-most-significant bits, $p$ and $q$ respectively, are used to operate the Exclusive-OR and AND gates as shown. The logical operation of these gates, the digits fed to inputs $a$ of adder S3 (to the inputs $b$ of which is fed a digital representation of $2\pi I_S$), and the output from S3, representing $2\pi I_2$, are set out in Table 2; it should be borne in mind that in a three-bit adder such as S3, adding 7 is equivalent to subtracting 1. (It has been assumed that $I_S$ and $I_2$ are not negative).

TABLE 2

| Digits | | Output | Output | S3 | |
|---|---|---|---|---|---|
| p | q | EXOR | AND | Input | Output |
| 1 | 0 | 1 | 0 | 0 0 1 | $I_s + 1$ |
| 1 | 1 | 0 | 0 | 0 0 0 | $I_s$ |
| 0 | 0 | 0 | 0 | 0 0 0 | $I_s$ |
| 0 | 1 | 1 | 1 | 1 1 1 | $I_s - 1$ |

Inspection of Tables 1 and 2 will confirm that the circuit arrangement produces a binary digital representation of $\Phi_2$ as set out in equation (xiv) above, resolving ambiguity in accordance with conditions (xv) to (xvii). It may be noted from the Tables that the circuit has been so arranged as to resolve ambiguity in specific senses for the cases of $(f_2 - f_S)$ equal to −4 to +4, i.e. for the cases where the error angle (in this example $2\pi (F_2 - F_S)$) is −$\pi$ and +$\pi$ respectively. Where no reasonable assumptions can be made as to the conditions likely to cause such error angles, the senses in which the ambiguity is resolved in these cases may be arbitrary, resulting in this example from the particular circuit arrangement used. It will however be seen from the foregoing consideration of the requirement for correct ambiguity resolution (inequality (xxv)) that error angles of magnitude equal to $\pi$ should not occur in normal operation.

The above-described circuit arrangement is suitable for positive values of "$I_2$" is not greater than 7. The circuit is somewhat more complex than is essential for the interferometer of FIGS. 1 and 2, but it may readily be adapted for use in other or more complicated interferometer systems. For example, an additional binary adder may be required, or adder S1 with its associated input and output lines may be modified or omitted where other arrangements for obtaining the quantity notionally equal to the required quantity (representing the angle of which the ambiguous phase-measurement $2\pi F$ is available) are appropriate.

Figure 4:
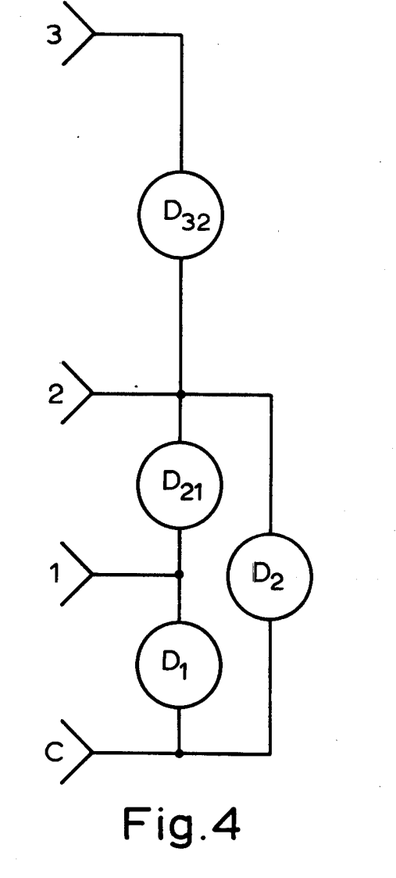
FIGS. 4, 5, 6 and 7 illustrate schematically second, third, fourth and fifth radio interferometer systems respectively.

Examples of other arrangements in which the method of the invention can be applied will now be described with reference to FIGS. 4 and 5, which depict interferometer systems each suitably comprising (in addition to the antenna elements and discriminators shown) mixers, amplifiers, Johnson-to-binary code converters, and a logic stage in analogous arrangements to that of FIG. 2: these parts of the system have been omitted from the FIGS. for simplicity. The radio interferometer system represented schematically in FIG. 4 is that of FIG. 1 with a further aerial element 3 collinear with the other elements and spaced from element 2 by an interval of 2L; a discriminator $D_{32}$ is arranged to measure the phase difference $2\pi F_{32}$ between elements 3 and 2. Since the interferometer pairs 3 and 2 and 2 and C have the same spacing, the angles $\Phi_{32}$ and $\Phi_2$ are notionally equal. Hence, if the unambiguous angle $\Phi_2$ is known, $\Phi_{32}$ can be derived from $\Phi_2$ and $2\pi F_{32}$, provided that it may be assumed that $|\Phi_{32} - \Phi_2| < \pi$, by a method analogous to that described above with reference to FIG. 1 and to equations (viii) and (xii) to (xvii).

Figure 5:
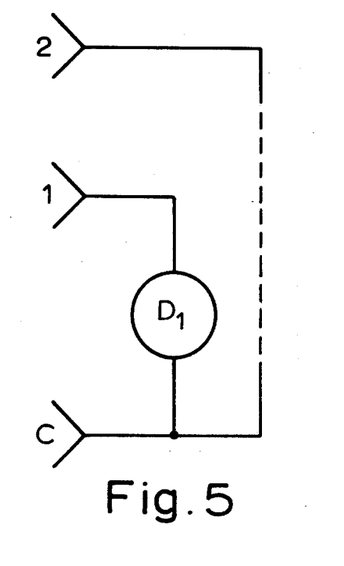

The radio interferometer represented schematically in FIG. 5 comprises aerial elements 1 and 2 spaced from a common element C by respective intervals $L_1$, $L_2$; the elements are collinear, and $L_1/L_2 = r$. A discriminator $D_1$ is arranged to measure the phase difference $2\pi F_1$ between elements 1 and C. If the unambiguous phase difference $\Phi_2$ is known (having been determined, for example, with an arrangement such as that of FIG. 4), then the unambiguous phase difference $\Phi_1$ can be determined from the measurement $2\pi F_1$ and the angle $r \Phi_2$, which is notionally equal to $\Phi_1$, by a method analogous to that described above, provided that it may be assumed that $|\Phi_1 - r \Phi_2| < \pi$. Obtaining a quantity representative of $r \Phi_2$ may of course involve both multiplication and division, depending on the value of $r$ and the particular method used. Element C may be intermediate elements 1 and 2.

In contrast to the arrangement of FIG. 1, the arrangements of FIGS. 4 and 5 require at least elements C, 2, 3 and C, 1, 2 respectively to be collinear. Furthermore, the ambiguity resolution method in the latter two arrangements, using a circuit analogous to that of FIG. 2, may be shown to be dependent on propagation and amplifier phase errors. Theoretical analysis of the arrangement of FIG. 5 suggests that the tolerance to phase errors is greater for $r < 1$ (as depicted in the FIG.) than for $r > 1$.

The arrangement described with reference to FIG. 1 may be modified by the addition of one or more further antenna elements intermediate those of the widest-spaced pair and the same number of additional phase discriminators so that a phase-difference between the two elements of each pair of adjacent elements can be measured; it is of course necessary that each of these phase-difference measurements is unambiguous. The unambiguous phase difference between the elements of the widest-spaced pair can then be determined from the unambiguous sum of the above-mentioned phase-difference measurements and from the ambiguous phase-difference measurement at that pair, provided that it may be assumed that the difference between the unambiguous phase-difference and the sum is less than $\pi$.

Figure 6:
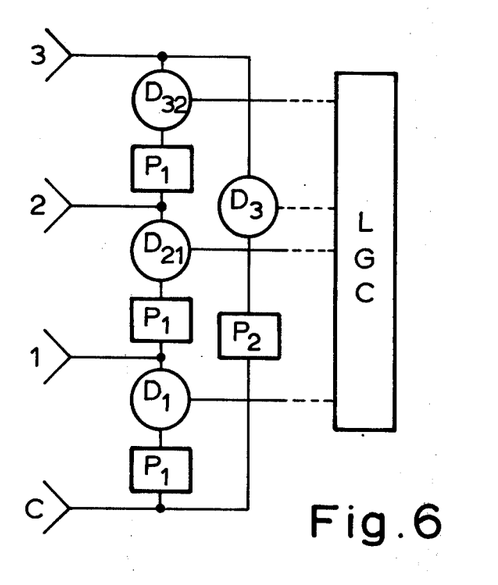

The radio interferometer system shown schematically in FIG. 6 may be used as a sector-definition arrangement, for example in the vertical radio interferometer system described in the above-mentioned U.K. specification No. 1,337,099. The system of FIG. 6 comprises a vertically-extending series of four collinear, aerial elements C, 1, 2, and 3, regularly spaced at intervals of L, and four phase discriminators $D_1$, $D_{21}$, $D_{32}$ and $D_3$ each arranged to measure phases in the range of 0 to $2\pi$, divided into sub-ranges of $\pi/4$; the common element C is the lowest of the elements. The system suitably further comprises mixers, amplifiers and code converters in analogous arrangement to that of FIG. 2 but omitted from the Figure for simplicity. In order to help to ensure that the phase differences measured by each of the discriminators, in this case the phase of radiation incident on a higher element relative to the phase of the radiation incident on a lower element, is unlikely to be negative (which might otherwise occur at small angles of elevation $\theta$ and which would of course be indicated as a large positive phase difference), a known phase delay $P_1$ is introduced between each of the three discriminators arranged to measure a phase difference between the two elements of a pair of adjacent elements and the lower element of that pair; $P_1$ is in this case $\pi/8$. In addition, a further delay is effectively introduced by adding to the pure binary representation of the phase difference measured by each of the said three discriminators a digital representation of $\pi/4$; this is performed in the logic stage LGC. Thus, in the determination of elevation angles near zero, there is a tolerance to phase errors of at least $3\pi/8$. Analogously, a phase delay of $P_2 = \pi/8$ is introduced between discriminator $D_3$ and element C, and an additional effective phase delay is introduced in the binary representation derived from that discriminator by adding a digital representation of $\pi$ in the logic stage. Predetermined phase delays may analogously be introduced in other embodiments of the invention.

$\Phi_3$ can then be determined unambiguously from the ambiguous measurement $2\pi F_3$ radians and the unambiguous sum $\Phi_S = (\Phi_1 + \Phi_{21} + \Phi_{32})$, provided that it may be assumed that the difference between $\Phi_S$ and $\Phi_3$ is less than $\pi$.

The logic stage in the system of FIG. 6 may comprise the circuit arrangement shown in FIG. 3. In this case, an additional binary adder may be used to supply a binary digital representation of $(\Phi_1 + \Phi_{21})$ to inputs $a$ of adder S1; a representation of $\Phi_{32}$ is supplied to inputs $b$ of adder S1; and a representation of $2\pi F_3$ is supplied both to inputs $b$ of adder S2 and to the output of the circuit arrangement.

It may be noted that the two quantities respectively representing the sum $\Phi_S$ and $2\pi F_3$ in the logic stage each include the same known constant of $9\pi/8$ radians, and therefore the ambiguity-resolution process is unaffected by the presence of these constants. The angle of elevation can then be determined by one of the averaging methods described by way of example in the aforementioned U.K. specification, for example from the average of the two phase differences between the elements of the interferometer pairs of spacing 2L, i.e. from $$\tfrac{1}{2}[(\Phi_3 - \Phi_1) + (\Phi_2) - 3\pi/2]$$

which may be written $$\tfrac{1}{2}[\Phi_3 + \Phi_{21}] = 3\pi/2].$$

Another radio interferometer system embodying the invention will now be described with reference to FIG. 7, which shows schematically a system comprising a rectilinear series of (N + 1) antenna elements, including a common element C, regularly spaced at intervals of L so as to form a series of N interferometer pairs of respective spacings L, 2L, ... (N − 1)L, N L, a first series of N phase discriminators $D_n$ for respectively measuring a phase difference between the elements of each of the said N pairs (n being an integer between 1 and N), and a second series of (N − 1) phase discriminators $D_{n(n-1)}$ for respectively measuring a phase difference between the two elements of each pair of adjacent elements except the pair including the common element C. $N \geq 2$, and for example, N = 8. The system is adapted to measure the angle of elevation of incident radiation: the series of elements extends vertically, and each of the phase discriminators is adapted to measure phase in the range of 0 to $2\pi$ radians, the measurements being digitised into sub-ranges of $\pi/4$. Elevation angles can be derived within a range of coverage which is determined by the range within which the phase measurements between the elements of each pair of adjacent elements are unambiguous. This will later be examined in detail. The system also includes mixers to each of which a local-oscillator signal is applied, amplifiers, and Johnson-to-binary code converters, in an analogous arrangement to that of FIG. 2 (these stages have been omitted from the Figure for simplicity) and a logic stage LGC fed from the converters.

As described in the above-mentioned U.K. specification, a phase modulator PM modulates the phase of the signal derived from the common element with a function W which in this case is a triangular wave of peak-to-peak amplitude also equal to $\pi/4$; by integration over an interval of time not less than the period of W, a more sensitive representation of phase (for example, in digital form with further, less significant digits, or in analogue form) than to within $+ \pi/8$ (i.e. half the sub-range) can be obtained. The varying phase W is introduced into each of the phase-difference measurements made by the discriminators $D_n$ but not into those made by the discriminators $D_{n(n-1)}$. It should be noted that for the purposes of this specification, the function W constitutes an error (albeit an intentionally-introduced one) in the phase-difference measurements, except of course at the instants when W = 0. An additional discriminator $D_1'$ is arranged to measure the phase difference $\Phi_1' = 2\pi F_1'$ between signals derived from the first and common elements before the stage PM, i.e. not including the function W. The unambiguous phase difference $\Phi_1$ is determined from the phase-difference measurements $2\pi F_1$ and $2\pi F_1'$ (the latter being unambiguous) by a method embodying the invention. Using notation analogous to that used in the analysis of the system of FIG. 2, $\Phi_1$ can be derived unambiguously provided $|\Phi_1 - \Phi_1'| < \pi$, i.e. $|2\pi L \sin \theta/\lambda + G_1 + A_1 - G_C - A_C +$ (xxvi)
$M_1 + Q_1 + W - 2\pi L \sin \theta/\lambda + G_1 + A_1 -$
$G_C - A_C + M_1 + Q_1'| < \pi$ i.e. $2|M + Q| + |W| < \pi$. (xxvii)

For $W = 22\frac{1}{2}°$ and assuming, as before, a value of $25\frac{1}{2}°$ for the maximum value of $|M + Q|$, it can be seen that the condition is easily satisfied.

The unambiguous phase-difference $\Phi_2$ can then be derived from the ambiguous phase-difference measurement $2\pi F_2$ and the unambiguous sum ($\Phi_1 + \Phi_{21}$), and the remaining members of the series $\Phi_n$ can similarly be successively derived by a respective logic circuit of the kind shown in FIG. 3. By analogy with equation (xii), $$\Phi_S = 2\pi (I_S + F_S) = \Phi_{n-1} + \Phi_{n(n-1)}$$ (xxviii)

where $\Phi_{n-1}$ is derived from the preceding logic circuit, and $\Phi_{n(n-1)}$ is the unambiguous phase-measurement $2\pi F_{n(n-1)}$ obtained from discriminator $D_{n(n-1)}$. Then $$\Phi_n = 2\pi (I_n + F_n)$$ (xxix)

where $F_n$ is obtained from the measurement of discriminator $D_n$, and $I_n$ is determined from $I_S$ in accordance with the value of $(F_n - F_S)$ by analogy with equations (xv) to (xvii). Thus, in the circuit of FIG. 3, a binary digital representation of $\Phi_{n-1}$ is fed to inputs $a$ of adder S1, a representation of $2\pi F_{n(n-1)}$ is fed to inputs $b$ of S1, and a representation of $2\pi F_n$ is fed to inputs $b$ of adder S2.

It should be noted that since $F_n$ and $F_S$ are both subject to the same instantaneous error due to W, the ambiguity-resolution process is unaffected by the presence of W.

The range of coverage of elevation angles will now be examined. It is necessary that all the phase-difference measurements between adjacent elements should be unambiguous. Now $$\Phi_{n(n-1)} = 2\pi L \sin \theta/\lambda + G_n + A_n - G_{n-1} - A_{n-1} + M_{n(n-1)} + Q_{n(n-1)}.$$ (xxx)

$\Phi_{n(n-1)}$ must lie within a predetermined range of $2\pi$ radians; this may be stated in general terms as $$0 \leq \Phi_{n(n-1)} + T < 2\pi$$ (xxxi)

where T is a constant. The various sources of error will be dealt with in turn:

(a) Propagation errors G: for a vertical array, one of the main sources of errors in practice is the presence at low elevation angles of strong specular ground-reflected signals. A computer simulation shows that for a typical array of eight horn antennas spaced 18 cm. apart with a sin x/x form of polar diagram having a 3 dB beamwidth of 9°, the aerial axes being tilted back at 12° to the horizontal and operating at approximately 5 GHz, the sum ($2\pi L \sin \theta/\lambda + G_n - G_{n-1}$) is substantially never negative. At elevation angles above about 10°, the phase error due to ground reflection can be assumed not to exceed 10°. A further allowance of + 10° may be made for random scattering effects.

(b) Amplifier errors A: allow + 5° for $(A_n - A_{n-1})$.

(c) Discriminator errors M and Q: if the boundaries of the sub-ranges into which the range of measurement is divided are so arranged that the lowest boundary is at zero and the highest at $2\pi$, the possible quantisation error Q has no effect on the angular coverage of the array, since we are concerned at the lower end of the coverage only with errors which might cause a measured phase difference to be equivalent to a negative phase difference, i.e. with $-|M_{MAX}|$, and at the upper end of coverage, with errors which could result in a measured phase difference equivalent to a phase difference greater than $2\pi$, i.e. with $+ |M_{MAX}|$. Assume $|M_{MAX}| = 3°$.

The limits of coverage will now be found with reference to equations (xxx) and (xxxi). For the lower limit, $$\Phi_{n(n-1)} + T \geq 0.$$ (xxxii)

Inserting the above-discussed values in equation (xxx), $$-10° - 5° - 3° + T \geq 0.$$ (xxxiii)

Thus, if coverage down to zero elevation is desired, a value for T of $+45°$ ($\pi/4$) will leave a margin of phase error of 27°. The addition of T to each value of $\Phi_{n(n-1)}$ can be performed simply in the logic stage LGS, as discussed above with reference to FIG. 5. (For subsequent processing of the derived values of $\Phi_n$, T or multiples thereof may have to be subtracted.)

For the upper limit of coverage, $$\Phi_{n(n-1)} + T < 360°$$ (xxxiv)

i.e. $180/\pi (2\pi L \sin \theta/\lambda) + 20 + 5 + 3 + 45 < 360.$ (xxxv)

For $L = 18$ cm and $\lambda = 6$ cm, this implies a maximum value for $\theta$ of some 15°. This may be compared with the coverage of approximately half that amount which is obtainable with the system described in the above-mentioned U.K. specification when operating in its basic mode, i.e. without the aid of a further sector-definition array. The doubled coverage obtained with the system embodying the present invention, using the same number of antenna elements with similar spacing, is of course due to the fact that in the earlier system, the phase difference between adjacent elements must not exceed $\pi$ (since it is necessary to be able to distinguish between positive and negative phase differences), whilst in the present system, the phase difference between adjacent elements must not exceed $2\pi$.

It may be noted here that the limits of coverage are not affected by the phase modulation function W, since phase-difference measurements are made between signals which are derived respectively from each two adjacent aerials and which do not include W.

The value of $\theta$ may be derived from the values of $\Phi_n$ in any suitable manner; for example, any of the averaging processes discussed in the above-mentioned U.K. specification may be used. Alternatively, more complex processing methods which take account of relative signal amplitudes as well as relative signal phases of radiation incident on the elements may be used to derive a suitably weighted average value for $\theta$.

Figure 7:
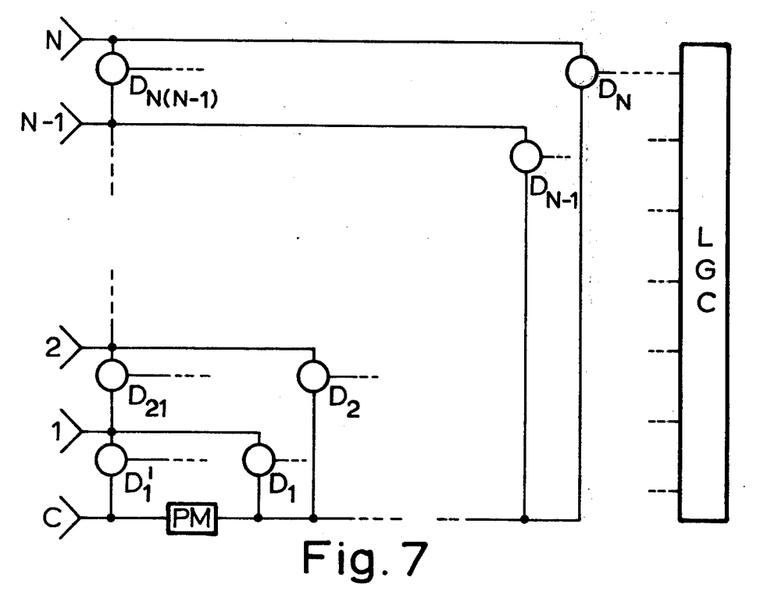

The use of the phase-modulation function W to increase sensitivity has been described above with reference to the particular embodiment of FIG. 7; it will of course be appreciated that it may be used in an analogous manner in any embodiment of the invention in which phase differences are represented in digital form.

The system described with reference to FIG. 7 may be adapted to measure the azimuth angle of incident radiation by arranging the aerial elements in a horizontal line. Without further modification, the system may be used to measure azimuth angles known to lie in a sector of which one boundary is the normal to the line on which the elements lie. If the system is to be used (without additional equipment) to measure azimuth angles which may lie within a sector symmetrical about the said normal, the phase discriminators should suitably be adapted to measure phases in the range of $-\pi$ to $+\pi$; for maximum angular coverage, the boundaries of the sub-ranges for phase measurement should be so arranged that the outermost boundaries lie at $-\pi$ and $+\pi$ respectively, with a central boundary at zero. It may be noted that in conditions of use such that propagation errors due to scattering are significant, the total angular coverage will usually be less than that of a corresponding elevation angle system. This deficiency may be alleviated by using in addition a sector-definition system or an ambiguity-resolution system comprising antenna elements more closely spaced than those of the main system; this additional system may have one or more elements in common with the main system so as to tend to reduce the effects of propagation and amplifier errors. Such an additional system may of course be used in other radio interferometer systems embodying the invention, for example one for measuring elevation angles.

What we claim is:

1. A method of resolving angular ambiguity in measurements of phase difference between a pair of signals comprising the steps of:
   (a) measuring the phase difference between said pair of signals to obtain a first quantity representative of the ambiguous phase difference $2 \pi F_1$ between said pair of signals, where $F_1$ is a fraction;
   (b) deriving, from at least one signal of said pair of signals and a third signal, an unambiguous angle $2 \pi (F_2 + I_2)$ which is ideally equal to the desired unambiguous phase difference $\Phi_1 = 2 \pi (F_1 + I_1)$ between said pair of signals but may differ therefrom by an amount representative of an error angle of magnitude less than $\pi$ radians, where $F_2$ is a fraction and $I_1$ and $I_2$ are either zero or an integer;
   (c) generating a second and third quantity representative of the components $2 \pi F_2$ and $2 \pi I_2$, respectively, of said unambiguous angle;
   (d) deriving, from said first and second quantities, a fourth quantity representative of the difference between said measured phase difference $2 \pi F_1$ and said component $2 \pi F_2$ of said unambiguous angle;
   (e) calculating the value of $2 \pi I_1$ by adding to said third quantity a quantity representative of $2 \pi n$, where n is a plus one, a minus one or a zero depending on whether said fourth quantity is less, greater, or the magnitude thereof is less than a predetermined value, respectively; and
   (f) adding the calculated of value of $2 \pi I_1$ to said first quantity to obtain a quantity representative of the unambiguous value of said phase difference.

2. The method according to claim 1 wherein said unambiguous angle is ideally equal to the sum of a first phase difference between said one signal and said third signal and a second phase difference between said third signal and the other signal of said pair of signals, the magnitude of said first and second phase differences each being less than $2 \pi$ radians, and said step of deriving said unambiguous angle includes the steps of measuring said first and second phase differences and computing the sum of said first and second phase differences to obtain said unambiguous angle.

3. The method according to claim 1 wherein said unambiguous angle is proportional to a first phase difference between one signal of said pair of signals and said third signal and said step of deriving said unambiguous angle includes the steps of measuring said first phase difference between said one signal and said third signal and multiplying said first phase difference by predetermined constant to obtain said unambiguous angle.

4. The method according to claim 3 wherein said predetermined constant is less than one.

5. Apparatus for resolving angular ambiguity in measurements of phase difference between a pair of signals comprising means for measuring the phase difference between said pair of signals to obtain a first quantity representative of an ambiguous phase difference $2 \pi F_1$ between said pair of signals, where $F_1$ is a fraction; means for deriving, from at least one signal of said pair of signals and a third signal, an unambiguous angle $2 \pi (F_2 + I_2)$ which is ideally equal to the desired unambiguous phase difference $\Phi_1 = 2 \pi (F_1 + I_1)$ between said pair of signals but may differ therefrom by an amount representative of an error angle of magnitude less than $\pi$ radians, where $F_2$ is a fraction and $I_1$ and $I_2$ are either zero or an integer; said deriving means including means for generating a second and third quantity representative of the components $2 \pi F_2$ and $2 \pi I_2$, respectively, of said unambiguous angle; means coupled to said generating means and said measuring means for computing from said first and second quantities a fourth quantity representative of the difference between said measured phase difference $2 \pi F_1$ and said component $2 \pi F_2$ of said unambiguous angle; means coupled to said computing means for calculating the value of $2 \pi I_1$ by adding to said third quantity a quantity representative of $2 \pi n$, where n is a plus one, a minus one or a zero depending on whether said fourth quantity is less, greater, or the magnitude thereof is less than a predetermined value, respectively; and means for adding the calculated of value of $2 \pi I_1$ to said first quantity to obtain a quantity representative of the unambiguous value of said phase difference.

6. The apparatus according to claim 5 wherein said unambiguous angle is ideally equal to the sum of a first phase difference between said one signal and said third signal and a second phase difference between said third signal and the other signal of said pair of signals, the magnitude of said first and second phase differences each being less than $2 \pi$ radians, said means for deriving said unambiguous angle includes means for measuring said first and second phase differences and means for computing the sum of said first and second phase differences to obtain said unambiguous angle.

7. The apparatus according to claim 5 wherein said unambiguous angle is ideally proportional to a first phase difference between one signal of said pair of signals and said third signal and said means for deriving said unambiguous angle includes means for measuring said first phase difference between said one signal and said third signal and means for multiplying said first phase difference by predetermined constant to obtain said unambiguous angle.

8. A radio interferometer system comprising an array of at least three spaced antenna elements; means coupled to a pair of said antenna elements for deriving from radiation incident on said elements a first signal representative of an ambiguous phase difference $2\pi F_1$ between signals received by said elements of said pair, where $F_1$ is a fraction; and means for resolving the ambiguity of said ambiguous phase difference including further means coupled to at least one antenna element of said pair of elements and a third antenna element of said array for deriving from radiation incident on said elements a signal representative of an unambiguous angle $2\pi (F_2 + I_2)$ which is ideally equal to the desired unambiguous phase difference $\Phi_1 = 2\pi (F_1 + I_1)$ between said signals received by said pair of elements but may differ therefrom by an amount representative of an error angle of magnitude less than $\pi$ radians, where $F_2$ is a fraction and $I_1$ and $I_2$ are either zero or an integer; said further deriving means including means for generating a second and third signal representative of the terms $2\pi F_2$ and $2\pi I_2$, respectively, of said unambiguous angle, logic means for deriving from said first and second signals a fourth signal representative of the difference between said ambiguous phase difference, $2\pi F_1$ and said term $2\pi F_2$ of said unambiguous angle; and logic means for calculating the value of $2\pi I_1$ by adding to said third signal a quantity representative of $2\pi n$, where n is a plus one, a minus one or a zero depending on whether said fourth signal is less, greater, or the magnitude thereof is less than a predetermined value, respectively; logic means for adding the calculated value of $2\pi I_1$ to said first signal to obtain a signal representative of the unambiguous value of said phase difference.

9. The system according to claim 8 wherein said elements of said array are collinear and spaced uniformally from each other, said first named deriving means includes means for measuring said ambiguous phase difference between said signals received by said pair of elements and means coupled to said measuring means for generating said first signal in binary form, and said further deriving means includes additional means for measuring a first phase difference between signals received by one of said elements of said pair and said third element, said first phase difference being proportional to said unambiguous angle, means coupled to said additional means for generating a binary signal representative of said first phase difference and logic means for multiplying said last named binary signal by a constant to obtain said unambiguous angle.

10. The system according to claim 9 wherein said constant is less than one.

11. The system according to claim 8 wherein said third antenna element is intermediate said antenna elements of said pair and spaced from each element of said pair a distance such that the phase of the signal received by said third element differs by less than $2\pi$ radians from the signals received by each element of said pair, said first named deriving means including means for measuring said ambiguous phase difference between said signals received by said pair of elements and means coupled to said measuring means for generating said first signal in digital form, and said further deriving means includes additional means for measuring a first phase difference between signals received by one antenna element of said pair and said third element and a second phase difference between signals received by said third element and the other antenna element of said pair, means coupled to said additional measuring means for generating a pair of binary signals representative of said first and second phase differences, respectively, and logic means for deriving from said pair of binary signals, a signal representative of the sum of said first and second phase differences, said sum being representative of said unambiguous angle.

12. A radio interferometer system comprising a rectilinear series of $N+1$ antenna elements uniformally spaced from each other a distance such that the phase of the signal received by a given element in said series of elements differs by less than $2\pi$ radians from the signal received by the element adjacent to said given element, each of said elements forming, with one common element of said series, a series of N interferometer pairs of elements, where N is greater than two; means for measuring a phase difference $2\pi F_n$ between signals received by each of said interferometer pairs, where $n = 1, 2, \ldots N$, F is a fraction, and $2\pi F_n$ is the measured phase difference between signals received bu the nth pair of said interferometer pairs; means coupled to said measuring means for generating a first series of binary signals respectively representative of the measured phase difference $2\pi F_n$; further means for measuring a phase difference $2\pi F_{n\,(n-1)}$ between signals received by each pair of adjacent antenna elements except the pair including said common element, where $n = 2, 3 \ldots N-1$, N, and $2\pi F_{n\,(n-1)}$ is the measured phase difference between signals received by the nth and (n−1)th elements in said series of elements; second means coupled to said further means for generating a second series of binary signals respectively representative of the measured phase difference $2\pi F_{n\,(n-1)}$; and means for resolving ambiguity of the measured phase difference $2\pi F_n$, said resolving means including means for computing the sum of said second series of signals and the signal of said first series representative of the phase difference $2\pi F_1$ associated with the interferometer pair formed by said common element and the element adjacent thereto, said sum being representative of an unambiguous angle $2\pi (F + I)$ which is ideally equal to the desired unambiguous phase difference $\Phi_n = 2\pi (F_n + I_n)$ between said signals received by the nth interferometer pair but may differ therefrom by an amount representative of an error angle of magnitude less than $\pi$ radians, where F is a fraction and I and $I_n$ are either zero or an integer, means for generating a first and second digital signal representative of the terms $2\pi F$ and $2 I$, respectively, of said unambiguous angle, logic means for deriving from the nth signal of said first series of signals and said first digital signal a third digital signal representative of the difference between the phase difference, $2\pi F_n$ and said terms $2\pi F$ of said unambiguous angle; logic means for calculating the value of the term $2\pi I_n$ by adding to said second digital signal a quantity representative of $2\pi k$, where k is a plus one, a minus one or a zero depending on whether said third digital signal is less, greater, or the magnitude thereof is less than a predetermined value, respectively; and logic means for adding the calculated value of $2\pi I_n$ to said nth signal representative of the phase difference $2\pi F_n$ to obtain a signal representative of the unambiguous value of the phase difference associated with said nth interferometer pair.

13. The system according to claim 12 wherein said measuring means includes a phase discriminator coupled to the antenna elements of each of said interferometer pairs, said further measuring means includes a phase discriminator coupled to the elements of each pair of adjacent elements.

14. The system according to claim 13 including means for introducing a periodic phase variation having an average value of substantially zero over a predetermined period of time in each of said phase differences $2\pi F_n$ measured by said first measuring means and means for measuring said phase difference $2\pi F_1$ associated with said interferometer pair formed by said common element and said element adjacent thereto.

15. The system according to claim 14 wherein said introducing means includes means for phase modulating the signal received by said common element.

16. The system according to claim 15 including means for deriving over a period not less than said predetermined period a time average value of said phase difference $2\pi F_n$.

* * * * *